(12) United States Patent
Nakamura et al.

(10) Patent No.: US 12,291,487 B2
(45) Date of Patent: May 6, 2025

(54) COMPOSITE PARTICLES

(71) Applicant: NISSHIN ENGINEERING INC., Tokyo (JP)

(72) Inventors: Keitaroh Nakamura, Fujimino (JP); Daisuke Sato, Fujimino (JP)

(73) Assignee: NISSHIN ENGINEERING INC., Tokyo (JP)

( * ) Notice: Subject to any disclaimer, the term of this patent is extended or adjusted under 35 U.S.C. 154(b) by 742 days.

(21) Appl. No.: 17/040,441

(22) PCT Filed: Mar. 11, 2019

(86) PCT No.: PCT/JP2019/009659
§ 371 (c)(1),
(2) Date: Sep. 22, 2020

(87) PCT Pub. No.: WO2019/181604
PCT Pub. Date: Sep. 26, 2019

(65) Prior Publication Data
US 2021/0024423 A1    Jan. 28, 2021

(30) Foreign Application Priority Data

Mar. 23, 2018   (JP) ................ 2018-056027

(51) Int. Cl.
*C04B 35/56* (2006.01)
*C01B 32/90* (2017.01)
*C04B 35/626* (2006.01)

(52) U.S. Cl.
CPC .......... *C04B 35/5615* (2013.01); *C01B 32/90* (2017.08); *C04B 35/6264* (2013.01); *C04B 35/62665* (2013.01); *C01P 2004/64* (2013.01)

(58) Field of Classification Search
CPC ............ C04B 35/5615; C04B 35/6264; C04B 35/62665; C04B 35/5611;
(Continued)

(56) References Cited

U.S. PATENT DOCUMENTS 9,751,769 B2    9/2017  Watanabe et al.
2015/0175429 A1*  6/2015  Watanabe ............. C01B 32/921
                                                   423/440

FOREIGN PATENT DOCUMENTS

CN    102659106 A  *  9/2012 ............ C01B 31/30
CN    104411634 A      3/2015
(Continued)

OTHER PUBLICATIONS

Konno et al. Synthesis of single- and multi-component carbides utilizing exfoliated graphite. Tanso 2006, No. 221. p. 8-13.*
(Continued)

*Primary Examiner* — Bryan D. Ripa
*Assistant Examiner* — Cameron K Miller
(74) *Attorney, Agent, or Firm* — MUNCY, GEISSLER, OLDS & LOWE, P.C.

(57) ABSTRACT

Provided are: composite particles having excellent oxidation resistance; and a method for producing composite particles. The composite particles are obtained by forming a composite of TiC and at least one of Zr and Si. In the method for producing composite particles, a titanium oxide powder and at least one of a zirconium oxide powder and a silicon oxide powder are used as raw material powders, and composite particles are produced using a gas phase method.

1 Claim, 3 Drawing Sheets

(58) Field of Classification Search
CPC .... C04B 2235/3244; C04B 2235/3418; C01B 32/90; C01B 32/921
See application file for complete search history.

(56) References Cited

FOREIGN PATENT DOCUMENTS

| CN | 104671814 | A | | 6/2015 | |
|---|---|---|---|---|---|
| CN | 105218102 | A | | 1/2016 | |
| CN | 107010985 | A | | 8/2017 | |
| CN | 107697916 | A | | 2/2018 | |
| CN | 107827464 | A | | 3/2018 | |
| CN | 109467450 | A | | 3/2019 | |
| JP | S47-021399 | A | | 10/1972 | |
| JP | 2004107152 | A | * | 4/2004 | ............ C01B 31/30 |
| JP | 6061929 | B2 | * | 1/2017 | ............ C01B 32/90 |
| WO | WO-2011034129 | A1 | * | 3/2011 | ............ C01B 31/30 |
| WO | WO2014-002695 | A1 | | 3/2014 | |

OTHER PUBLICATIONS

Kero, Ida, Ragnar Tegman, and Marta-Lena Antti. "Phase reactions associated with the formation of Ti3SiC2 from TiC/Si powders." Ceramics International 37.7 (2011): 2615-2619. (Year: 2011).*

Gao, N. F., et al. "Rapid synthesis of dense Ti3SiC2 by spark plasma sintering." Journal of the European Ceramic Society 22.13 (2002): 2365-2370. (Year: 2002).*

Tsurekawa, S., et al. "Solid solution hardening of titanium carbide by niobium and zirconium at high-temperatures." Nippon Kinzoku Gakkaishi (1952) 55.4 (1991): 390-397. (Year: 1952).*

Tsurekawa machine translation (Year: 1952).*

Konno, Hidetaka et al., "Synthesis of single-and-multi-component carbides utilizing exfoliated graphite" Tanso, No. 221, 2006, pp. 8-13.

Teber, A. et al., "Fabrication, micro structure and mechanical properties of novel bulk binderless (Ti0.8Zr0.2) C carbides prepared by mechanical alloying and spark plasma singtering", Ceramics International, 2012, 38, pp. 4929-4933.

Lee, Hyung-Bock et al., "A Study on Synthesis and Characterization of TixZrl_xC Solid-Solution by Self-propagatioin High Temperature Synthesis Method", Journal of the Korean Ceramic Society, 1997, Vo. 34, No. 7, pp. 731-737.

Li, Ying, et al., "Spark plasma sintering of TiC-ZrC composites," Ceramics International, Feb. 11, 2015, pp. 7103-7108, vol. 41, Science Direct, Elsevier Ltd and Techna Group S.r.l.

Dai, Jingjie, et al.. "High temperature oxidation behavior and research status of modifications on improving high temperature oxidation resistance of titanium alloys and titanium aluminides: A review," Journal of Alloys and Compounds, Jun. 23, 2016, pp. 784-798, vol. 685, Elsevier B.V.

* cited by examiner

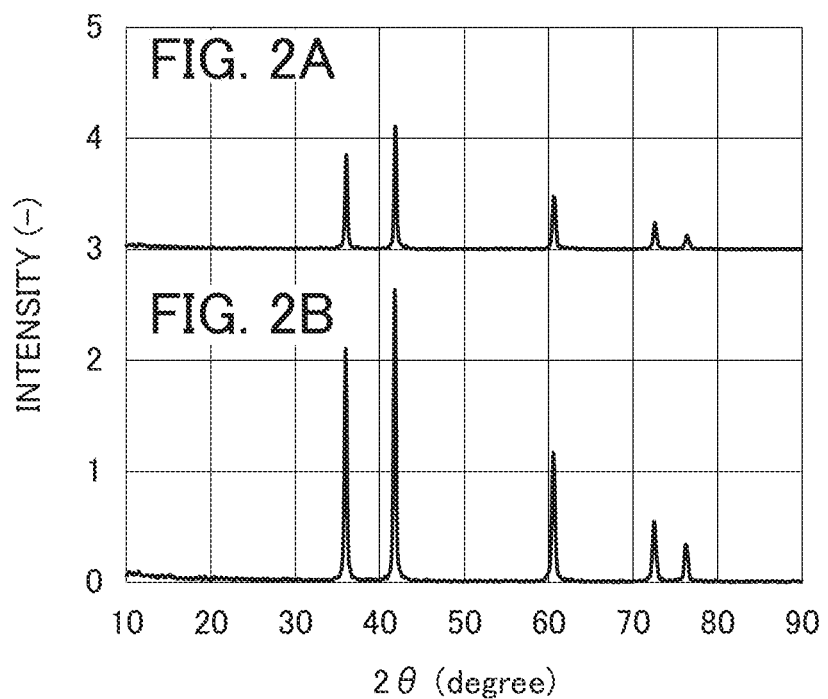
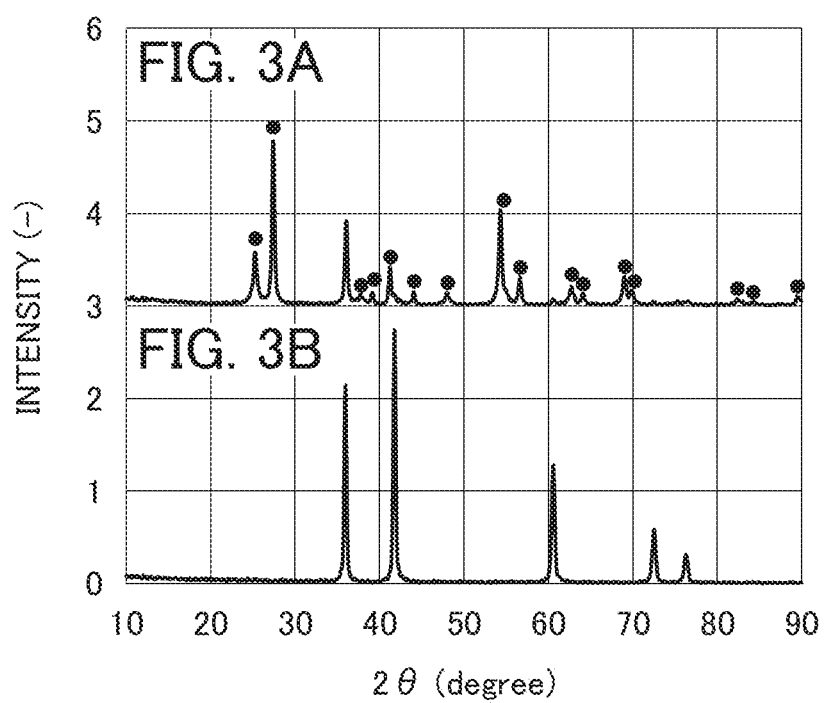

COMPOSITE PARTICLES

TECHNICAL FIELD

The present invention relates to composite particles of titanium carbide and a method of producing the composite particles, particularly to composite particles having excellent oxidation resistance and a method of producing the composite particles.

BACKGROUND ART

At present, various types of fine particles are used in various applications. For instance, fine particles such as metal fine particles, oxide fine particles, nitride fine particles and carbide fine particles have been used in electrical insulation materials for various electrical insulation parts, cutting tools, materials for machining tools, functional materials for sensors, sintered materials, electrode materials for fuel cells, and catalysts.

In connection with carbide fine particles of the foregoing types of fine particles, Patent Literature 1 describes a method of producing titanium carbide nanoparticles. Patent Literature 1 describes that titanium carbide nanoparticles having different volume resistance (electric resistance) values can be produced.

CITATION LIST

Patent Literature

Patent Literature 1: WO 2014/002695

SUMMARY OF INVENTION

Technical Problems

Conventionally, carbide fine particles having different volume resistance (electric resistance) values have been proposed as in Patent Literature 1 described above. At present, however, there are demands for broadening of a range of applications, addition of other functions, and the like. For instance, oxidation resistance or the like is being required.

An object of the present invention is to provide composite particles having excellent oxidation resistance and a method of producing the composite particles.

Solution to Problems

In order to attain the foregoing object, the present invention provides composite particles in which TiC is combined with at least one of Zr and Si.

When the TiC is combined with the Zr, a content of the Zr is preferably 0.1 to 20 mass %.

When the TiC is combined with the Si, a content of the Si is preferably 0.1 to 20 mass %.

When the TiC is combined with the Zr and the Si, a content of the Zr and a content of the Si are each preferably 0.1 to 10 mass %.

The present invention provides a method of producing composite particles in which TiC is combined with at least one of Zr and Si, wherein the composite particles are produced using powder of titanium oxide and powder of at least one of zirconium oxide and silicon oxide as feedstock by means of a gas-phase process.

Preferably, the gas-phase process is a thermal plasma process, a flame process, an arc plasma process, a microwave heating process or a pulsed wire process.

Preferably, the thermal plasma process involves: a step of converting a slurry, in which the feedstock is dispersed in a liquid, into droplets and supplying the droplets into a thermal plasma flame; and a step of supplying cooling gas to a terminating portion of the thermal plasma flame to thereby produce the composite particles.

Preferably, the liquid in which the feedstock is dispersed is alcohol.

Preferably, the thermal plasma flame is derived from hydrogen gas and at least one of helium gas and argon gas.

Advantageous Effects of Invention

The present invention makes it possible to provide composite particles having excellent oxidation resistance.

BRIEF DESCRIPTION OF DRAWINGS

FIG. 2A is a graph showing an analysis result of a crystal structure of titanium carbide before baking as obtained by X-ray diffractometry, and FIG. 2B is a graph showing an analysis result of a crystal structure of composite particles of titanium carbide and silicon before baking as obtained by X-ray diffractometry.

FIG. 3A is a graph showing an analysis result of a crystal structure of the titanium carbide after baking at a temperature of 200° C. for 15 minutes in the air as obtained by X-ray diffractometry, and FIG. 3B is a graph showing an analysis result of a crystal structure of the composite particles of titanium carbide and silicon after baking at a temperature of 300° C. for 15 minutes in the air.

DESCRIPTION OF EMBODIMENTS

On the following pages, composite particles and a method of producing composite particles according to the invention are described in detail with reference to preferred embodiments shown in the accompanying drawings.

Figure 1:
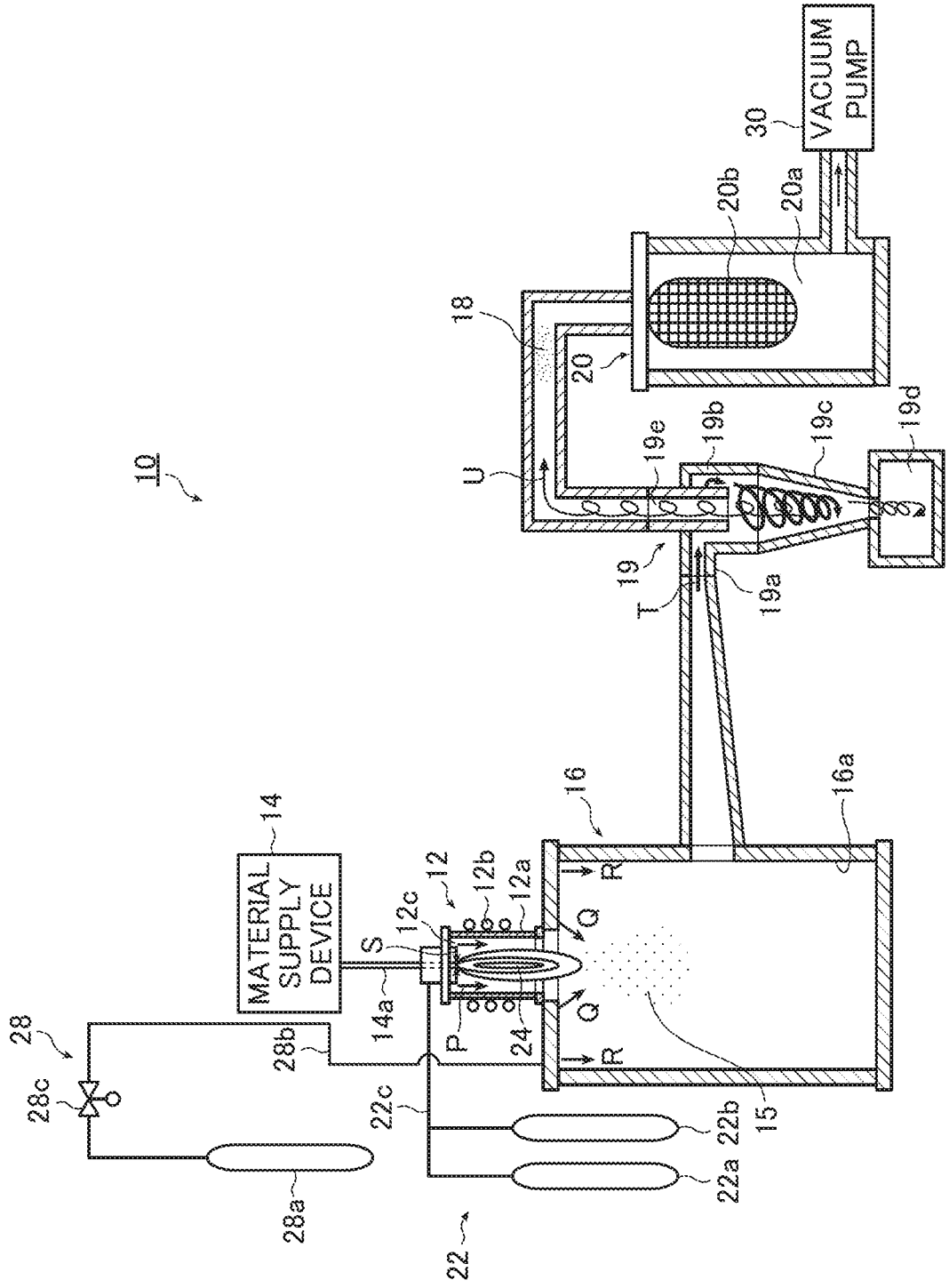
FIG. 1 is a schematic view showing an example of a fine particle production apparatus that is used in a method of producing composite particles according to an embodiment of the invention.

FIG. 1 is a schematic view showing an example of a fine particle production apparatus that is used in the method of producing composite particles according to an embodiment of the invention.

A fine particle production apparatus 10 (hereinafter referred to simply as "production apparatus 10") shown in FIG. 1 is used to produce composite particles.

The composite particles are particles obtained by combining TiC with at least one of Zr and Si. The composite particles refer not to particles in which various types of carbide particles such as TiC, ZrC and SiC are mixed and individually present but to carbide particles in which TiC and at least one of Zr and Si are contained in each particle. The forms of Zr and Si in the composite particles are not particularly limited, and Zr and Si may be in the form of not only a simple metal but also compounds such as a carbide, an oxide, an oxycarbide, a non-stoichiometric oxide and a non-stoichiometric carbide.

The composite particles are those called nanoparticles and may have a particle size of 1 to 100 nm. The particle size is the average particle size measured using the BET method. The composite particles are, for example, produced by a production method described later and are obtained not in a dispersed form in a solvent or the like but in a particulate form.

The production apparatus 10 includes a plasma torch 12 generating thermal plasma, a material supply device 14 supplying feedstock of the composite particles into the plasma torch 12, a chamber 16 serving as a cooling tank for use in producing primary fine particles 15 of the composite particles, a cyclone 19 removing, from the produced primary fine particles 15 of the composite particles, coarse particles having a particle size equal to or larger than an arbitrarily specified particle size, and a collecting section 20 collecting secondary fine particles 18 of the composite particles having a desired particle size as obtained by classification by the cyclone 19.

Various devices in, for example, JP 2007-138287 A may be used for the material supply device 14, the chamber 16, the cyclone 19 and the collecting section 20. The primary fine particles 15 of the composite particles are also simply called primary fine particles 15.

In this embodiment, for example, titanium oxide powder and at least one of zirconium oxide powder and silicon oxide powder are used as the feedstock in production of the composite particles.

The average particle size of the feedstock is appropriately set to allow easy evaporation of the feedstock in a thermal plasma flame and is, for example, up to 100 μm, preferably up to 10 μm and more preferably up to 5 μm.

The plasma torch 12 is constituted of a quartz tube 12a and a coil 12b for high frequency oscillation surrounding the outside of the quartz tube. A supply tube 14a to be described later which is for supplying the feedstock of the composite particles into the plasma torch 12 is provided on the top of the plasma torch 12 at the central part thereof. A plasma gas supply port 12c is formed in the peripheral portion of the supply tube 14a (on the same circumference). The plasma gas supply port 12c is in a ring shape.

A plasma gas supply source 22 is configured to supply plasma gas into the plasma torch 12 and for instance has a first gas supply section 22a and a second gas supply section 22b. The first gas supply section 22a and the second gas supply section 22b are connected to the plasma gas supply port 12c through piping 22c. Although not shown, the first gas supply section 22a and the second gas supply section 22b are each provided with a supply amount adjuster such as a valve for adjusting the supply amount. Plasma gas is supplied from the plasma gas supply source 22 into the plasma torch 12 through the plasma gas supply port 12c of ring shape in the direction indicated by arrow P and the direction indicated by arrow S.

For example, mixed gas of hydrogen gas and argon gas is used as plasma gas. The thermal plasma flame is derived from hydrogen gas and argon gas.

Hydrogen gas is stored in the first gas supply section 22a, while argon gas is stored in the second gas supply section 22b. Hydrogen gas is supplied from the first gas supply section 22a of the plasma gas supply source 22 and argon gas is supplied from the second gas supply section 22b thereof into the plasma torch 12 in the direction indicated by arrow P and the direction indicated by arrow S after passing through the piping 22c and then the plasma gas supply port 12c. Argon gas may be solely supplied in the direction indicated by arrow P.

When a high frequency voltage is applied to the coil 12b for high frequency oscillation, a thermal plasma flame 24 is generated in the plasma torch 12.

It is necessary for the thermal plasma flame 24 to have a higher temperature than the boiling point of the feedstock. A higher temperature of the thermal plasma flame 24 is more preferred because the feedstock is more easily converted into a gas phase state; however, there is no particular limitation on the temperature. For instance, the thermal plasma flame 24 may have a temperature of 6,000° C., and in theory, the temperature is deemed to reach around 10,000° C.

The ambient pressure inside the plasma torch 12 is preferably up to atmospheric pressure. For the atmosphere at a pressure up to atmospheric pressure, the pressure is not particularly limited and is, for example, in the range of 0.5 to 100 kPa.

While, for example, mixed gas of hydrogen gas and argon gas is used as plasma gas, the invention is not limited thereto, and the combination of hydrogen gas and helium gas may be employed. The thermal plasma flame is derived from hydrogen gas and at least one of helium gas and argon gas.

The periphery of the quartz tube 12a is surrounded by a concentrically formed tube (not shown), and cooling water is circulated between this tube and the quartz tube 12a to cool the quartz tube 12a with the water, thereby preventing the quartz tube 12a from having an excessively high temperature due to the thermal plasma flame 24 generated in the plasma torch 12.

The material supply device 14 is connected to the top of the plasma torch 12 through the supply tube 14a. The material supply device 14 is configured to supply the feedstock in a powdery form into the thermal plasma flame 24 in the plasma torch 12, for example.

For example, the device disclosed in JP 2011-213524 A may be used as the material supply device 14. In this case, the material supply device 14 includes a vessel (not shown) storing a slurry (not shown), an agitator (not shown) agitating the slurry in the vessel, a pump (not shown) applying a high pressure to the slurry to supply the slurry into the plasma torch 12 through the supply tube 14a, and an atomization gas supply source (not shown) supplying atomization gas used to supply the slurry into the plasma torch 12 in the form of droplets. The atomization gas supply source corresponds to a carrier gas supply source. The atomization gas is also called carrier gas.

The slurry refers to a dispersion liquid in which the feedstock is dispersed in a liquid. For instance, alcohols are usable as a liquid in which the feedstock is to be dispersed. Examples of alcohols include, for instance, ethanol, methanol, propanol and isopropyl alcohol, as well as industrial alcohols. The liquid in which the feedstock is to be dispersed is also called a dispersion medium.

The liquid in which the feedstock is to be dispersed (dispersion medium) is not limited to alcohols as long as it is a carbon-containing substance in a liquid form, and use may be made of ketone, kerosene, octane, ether and gasoline.

The material supply device 14 supplying the feedstock in the form of slurry supplies atomization gas, to which push-out pressure is applied, from the atomization gas supply source together with the slurry into the thermal plasma flame 24 in the plasma torch 12 through the supply tube 14a. The supply tube 14a has a two-fluid nozzle mechanism for spraying the slurry into the thermal plasma flame 24 in the plasma torch and converting it into droplets. Owing to this, the slurry can be sprayed into the thermal plasma flame 24 in the plasma torch 12, in other words, the slurry can be converted into droplets. For the atomization gas, for example, the same gases as those mentioned for the plasma gas above, namely, inert gases such as argon gas and helium gas, hydrogen gas, and mixed gas thereof may be used, as with the carrier gas.

Thus, the two-fluid nozzle mechanism is capable of applying a high pressure to the slurry and spraying the slurry by use of gas, i.e., the atomization gas (carrier gas), and the two-fluid mechanism is used as one method for converting the slurry into droplets.

It should be noted that the nozzle mechanism is not limited to the above-described two-fluid nozzle mechanism, and a single-fluid nozzle mechanism may also be used. For other methods, examples include a method which involves allowing a slurry to fall at a constant speed onto a rotating disk to convert the slurry into droplets (to form droplets) by the centrifugal force and a method which involves applying a high voltage to the surface of a slurry to convert the slurry into droplets (to generate droplets).

Supplying the feedstock in the form of slurry is not the only example; for instance, the device disclosed in JP 2007-138287 A may be used as the material supply device 14 which supplies the feedstock in a powdery form. In this case, the material supply device 14 includes, for example, a storage tank (not shown) storing the feedstock, a screw feeder (not shown) transporting the feedstock in a fixed amount, a dispersion section (not shown) dispersing the feedstock transported by the screw feeder to convert it into the form of primary particles before the feedstock is finally sprayed, and a carrier gas supply source (not shown).

Together with a carrier gas to which a push-out pressure is applied from the carrier gas supply source, the feedstock is supplied into the thermal plasma flame 24 in the plasma torch 12 through the supply tube 14a.

The configuration of the material supply device 14 is not particularly limited as long as the device can prevent the feedstock from agglomerating, thus making it possible to spray the feedstock in the plasma torch 12 with the dispersed state maintained. Inert gas such as argon gas is used as the carrier gas, for example. The flow rate of the carrier gas can be controlled using, for instance, a flowmeter such as a float type flowmeter. The flow rate value of the carrier gas is indicated by a reading on the flowmeter.

In this case, in addition to cooling gas, reactive gas is supplied as a carbon source. Methane gas is used as the reactive gas, for instance.

In supplying the feedstock using the carrier gas, an organic substance such as a carbon-based material or a resin may be added to the feedstock as a carbon source.

The chamber 16 is provided below the plasma torch 12 in a continuous manner, and a gas supply device 28 is connected to the chamber 16. The primary fine particles 15 of the composite particles are produced in the chamber 16. The chamber 16 also serves as a cooling tank.

The gas supply device 28 is configured to supply cooling gas into the chamber 16. The gas supply device 28 includes a gas supply source 28a and piping 28b, and further includes a pressure application means (not shown) such as a compressor or a blower which applies push-out pressure to the cooling gas to be supplied into the chamber 16. The gas supply device 28 is also provided with a pressure control valve 28c that controls the amount of gas supplied from the gas supply source 28a. For example, the gas supply source 28a stores argon gas. The cooling gas is argon gas.

The gas supply device 28 supplies mixed gas of argon gas with methane gas, hydrogen gas or the like as the cooling gas at, for example, 45 degrees in the direction of arrow Q toward a tail portion of the thermal plasma flame 24, i.e., the end of the thermal plasma flame 24 on the opposite side from the plasma gas supply port 12c, that is, a terminating portion of the thermal plasma flame 24, and also supplies the cooling gas from above to below along an inner wall 16a of the chamber 16, that is, in the direction of arrow R shown in FIG. 1.

The cooling gas supplied from the gas supply device 28 into the chamber 16 rapidly cools the feedstock having been converted to a gas phase state through the thermal plasma flame 24, thereby obtaining the primary fine particles 15 of the composite particles. Besides, the cooling gas has additional functions such as contribution to classification of the primary fine particles 15 in the cyclone 19.

When the primary fine particles 15 of the composite particles having just been produced collide with each other to form agglomerates, this causes nonuniform particle size, resulting in lower quality. However, dilution of the primary fine particles 15 with the mixed gas supplied as the cooling gas in the direction of arrow Q toward the tail portion (terminating portion) of the thermal plasma flame prevents the fine particles from colliding with each other to agglomerate together.

In addition, the cooling gas supplied in the direction of arrow R prevents the primary fine particles 15 from adhering to the inner wall 16a of the chamber 16 in the process of collecting the primary fine particles 15, whereby the yield of the produced primary fine particles 15 is improved.

As shown in FIG. 1, the cyclone 19 is provided to the chamber 16 to classify the primary fine particles 15 of the composite particles based on a desired particle size. The cyclone 19 includes an inlet tube 19a which supplies the primary fine particles 15 from the chamber 16, a cylindrical outer tube 19b connected to the inlet tube 19a and positioned at an upper portion of the cyclone 19, a truncated conical part 19c continuing downward from the bottom of the outer tube 19b and having a gradually decreasing diameter, a coarse particle collecting chamber 19d connected to the bottom of the truncated conical part 19c for collecting coarse particles having a particle size equal to or larger than the above-mentioned desired particle size, and an inner tube 19e connected to the collecting section 20 to be detailed later and projecting from the outer tube 19b.

A gas stream containing the primary fine particles 15 is blown from the inlet tube 19a of the cyclone 19 to flow along the inner peripheral wall of the outer tube 19b, and accordingly, this gas stream flows in the direction from the inner peripheral wall of the outer tube 19b toward the truncated conical part 19c as indicated by arrow T in FIG. 1, thus forming a downward swirling stream.

When the downward swirling stream is inverted to an upward stream, coarse particles cannot follow the upward stream due to the balance between the centrifugal force and drag, fall down along the lateral surface of the truncated conical part 19c and are collected in the coarse particle collecting chamber 19d. Fine particles having been affected by the drag more than the centrifugal force are discharged to the outside of the system through the inner tube 19e along with the upward stream on the inner wall of the truncated conical part 19c.

The apparatus is configured such that a negative pressure (suction force) is exerted from the collecting section 20 to be detailed later through the inner tube 19e. Due to the negative pressure (suction force), the composite particles separated from the swirling gas stream are sucked as indicated by arrow U and sent to the collecting section 20 through the inner tube 19e.

On the extension of the inner tube 19e which is an outlet for the gas stream in the cyclone 19, the collecting section 20 is provided to collect the secondary fine particles (composite particles) 18 having a desired particle size on the order of nanometers. The collecting section 20 includes a collecting chamber 20a, a filter 20b provided in the collecting chamber 20a, and a vacuum pump 30 connected through a pipe provided at a lower portion of the collecting chamber 20a. The fine particles delivered from the cyclone 19 are sucked by the vacuum pump 30 to be introduced into the collecting chamber 20a, remain on the surface of the filter 20b, and are then collected.

It should be noted that the number of cyclones used in the production apparatus 10 is not limited to one and may be two or more.

Next, one example of the method of producing composite particles using the production apparatus 10 above is described below.

First, titanium oxide ($TiO_2$) powder and at least one of zirconium oxide ($ZrO_2$) powder and silicon oxide ($SiO_2$) powder are used as the feedstock of the composite particles. Powders with an average particle size of, for instance, not more than 5 μm are used as the feedstock. The feedstock is put in the material supply device 14.

When titanium oxide powder and zirconium oxide powder are used as the feedstock, composite particles of titanium carbide and zirconium can be obtained as the composite particles.

When titanium oxide powder and silicon oxide powder are used as the feedstock, composite particles of titanium carbide and silicon can be obtained as the composite particles.

For example, argon gas and hydrogen gas are used as the plasma gas, and a high frequency voltage is applied to the coil 12b for high frequency oscillation to generate the thermal plasma flame 24 in the plasma torch 12.

Further, for instance, argon gas is supplied as the cooling gas in the direction of arrow Q from the gas supply device 28 to the tail portion of the thermal plasma flame 24, i.e., the terminating portion of the thermal plasma flame 24. At that time, argon gas is supplied as the cooling gas also in the direction of arrow R.

In the method of producing carbide fine particles according to this embodiment, first, the feedstock is dispersed in a dispersion medium to obtain a slurry. At this time, the mixing ratio between the feedstock and the dispersion medium in the slurry is preferably 2-5:8-5 (20-50%:80-50%). Since the dispersion medium acts as a carbon source for carbonizing the feedstock while reducing the feedstock, the mass ratio between the feedstock and the dispersion medium is suitably changed to have surplus carbon, thus preparing the slurry.

In preparation of the slurry, one or a mixture of two or more selected from the group consisting of surfactants, polymers and coupling agents may be added. Examples of surfactants for use include a sorbitan fatty acid ester that is a nonionic surfactant. Examples of polymers for use include an ammonium polyacrylate. Examples of coupling agents for use include a silane coupling agent. By adding one or a mixture of two or more selected from the group consisting of surfactants, polymers and coupling agents to the slurry, the feedstock is more effectively prevented from aggregating in the dispersion medium, and thus the slurry can be stabilized.

The slurry prepared as above is introduced into the vessel (not shown) of the material supply device 14 shown in FIG. 1 and agitated by the agitator. Owing to this, the feedstock in the dispersion medium is prevented from precipitating, and the slurry is maintained with the feedstock being dispersed in the dispersion medium. The slurry may be continuously prepared by supplying the feedstock and the dispersion medium to the material supply device 14.

Next, the slurry is converted into droplets using the two-fluid nozzle mechanism, and the slurry in the form of droplets is supplied into the plasma torch 12 and thus into the thermal plasma flame generated in the plasma torch 12, whereby carbon is generated without burning the dispersion medium.

Next, the slurry is evaporated in the thermal plasma flame substantially free of oxygen, and the dispersion medium such as alcohol is decomposed without being burned whereby carbon is obtained. The amount of the dispersion medium in the slurry is adjusted such that this carbon is generated in a larger amount compared to the feedstock. The generated carbon and the feedstock react with each other so that a metal oxide is reduced to a metal. Thereafter, surplus carbon and the reduced metal react with each other so that a carbide is generated. The generated carbide is rapidly cooled by gas (cooling gas) injected in the direction indicated by arrow Q, and owing to the rapid cooling in the chamber 16, the primary fine particles 15 of the composite particles are obtained.

Subsequently, the primary fine particles 15 of the composite particles thus obtained in the chamber 16 are, together with a gas stream, blown through the inlet tube 19a of the cyclone 19 to flow along the inner peripheral wall of the outer tube 19b, and this gas stream flows along the inner peripheral wall of the outer tube 19b as indicated by arrow T in FIG. 1 to thereby form a swirling stream which goes downward. When the downward swirling stream is inverted to an upward stream, coarse particles cannot follow the upward stream due to the balance between the centrifugal force and drag, fall down along the lateral surface of the truncated conical part 19c and are collected in the coarse particle collecting chamber 19d. Fine particles having been affected by the drag more than the centrifugal force are discharged along the inner wall of the truncated conical part 19c to the outside of the system together with the upward stream on the inner wall.

Due to the negative pressure (suction force) applied by the vacuum pump 30 through the collecting section 20, the discharged secondary fine particles (composite particles) 18 are sucked in the direction indicated by arrow U in FIG. 1 and sent to the collecting section 20 through the inner tube 19e to be collected on the filter 20b of the collecting section 20. The internal pressure of the cyclone 19 at this time is preferably equal to or lower than the atmospheric pressure. For the particle size of the secondary fine particles (composite particles) 18, an arbitrary particle size on the order of nanometers is specified according to the intended purpose.

Thus, the composite particles can be easily and reliably obtained by merely subjecting the feedstock composed of titanium oxide powder and at least one of zirconium oxide powder and silicon oxide powder to plasma treatment.

Furthermore, the composite particles produced by the method of producing composite particles according to this embodiment have a narrow particle size distribution, in other words, have a uniform particle size, and coarse particles of 1 μm or more are hardly included.

While the primary fine particles of the composite particles are formed using a thermal plasma flame, the primary fine particles of the composite particles may be formed by a gas-phase process. Thus, the method of producing the primary fine particles of the composite particles is not limited to the thermal plasma process using a thermal plasma flame as long as it is the gas-phase process, and may alternatively be one using a flame process, an arc plasma process, a microwave heating process or a pulsed wire process.

The flame process herein is a method of synthesizing composite particles by using a flame as the heat source and putting feedstock in a gas phase or a liquid phase through the flame. In the flame process, the feedstock in a gas or liquid phase state is supplied to a flame, and then cooling gas is supplied to the flame to decrease the flame temperature, thus obtaining the primary fine particles 15 of the composite particles.

The feedstock in a gas phase state is, for example, feedstock dispersed in the foregoing carrier gas. The feedstock in a liquid phase state is feedstock dispersed in a solvent and is in the form of slurry.

For the cooling gas, the same gas as that used for the thermal plasma process described above can be used.

Next, the composite particles are described.

As described above, the composite particles of the invention are those called nanoparticles having a particle size of 1 to 100 nm. The particle size is the average particle size measured using the BET method.

The composite particles of the invention are not present in a dispersed form in a solvent or the like but present alone, as described above. Therefore, there is no particular limitation on the combination of a solvent and the like, and the degree of freedom is high in selection of a solvent.

As described above, the composite particles are particles obtained by combining TiC with at least one of Zr and Si.

When TiC is combined with Zr, the Zr content is preferably 0.1 to 20 mass %. The Zr content falling within the foregoing range leads to excellent oxidation resistance.

When TiC is combined with Si, the Si content is preferably 0.1 to 20 mass %. The Si content falling within the foregoing range leads to excellent oxidation resistance.

When TiC is combined with Zr and Si, the Zr content and the Si content are each preferably 0.1 to 10 mass %. Each of the Zr content and the Si content falling within the foregoing range leads to excellent oxidation resistance.

The contents (mass %) of the respective elements above can be measured and determined by XRF (X-ray fluorescence spectrometry), and the contents (mass %) of the respective elements are obtained with impurities being removed.

Specifically, in the case of the Zr content, the Zr content is represented by the percentage by mass of Zr when the contents (mass %) of the other elements than Ti and Zr are omitted from the contents (mass %) of all the elements measured by XRF (X-ray fluorescence spectrometry) and the total percentage by mass of Ti and Zr are defined as 100.

FIG. 2A is a graph showing an analysis result of a crystal structure of titanium carbide before baking as obtained by X-ray diffractometry, and FIG. 2B is a graph showing an analysis result of a crystal structure of composite particles of titanium carbide and silicon before baking as obtained by X-ray diffractometry. FIG. 3A is a graph showing an analysis result of a crystal structure of the titanium carbide after baking at a temperature of 200° C. for 15 minutes in the air as obtained by X-ray diffractometry, and FIG. 3B is a graph showing an analysis result of a crystal structure of the composite particles of titanium carbide and silicon after baking at a temperature of 300° C. for 15 minutes in the air. Dots in FIG. 3A indicate diffraction peaks of an oxide of titanium.

The comparison between FIGS. 3A and 3B reveals that the composite particles of titanium carbide and silicon hardly have the intensity of diffraction peaks attributed to an oxide of titanium even after baking at a temperature of 300° C. higher than 200° C. that is the baking temperature for the titanium carbide, thus having excellent oxidation resistance.

Also for the color, in the titanium carbide after baking at a temperature of 200° C. for 15 minutes in the air, powder changed to a whitish color as a whole with generation of an oxide of titanium, while the composite particles of titanium carbide and silicon did not exhibit any change in color even after baking at 300° C. for 15 minutes. It can be said also from this that the composite particles of titanium carbide and silicon can have a higher oxidation onset temperature and is more effective in terms of oxidation resistance than the titanium carbide.

Figure 4:
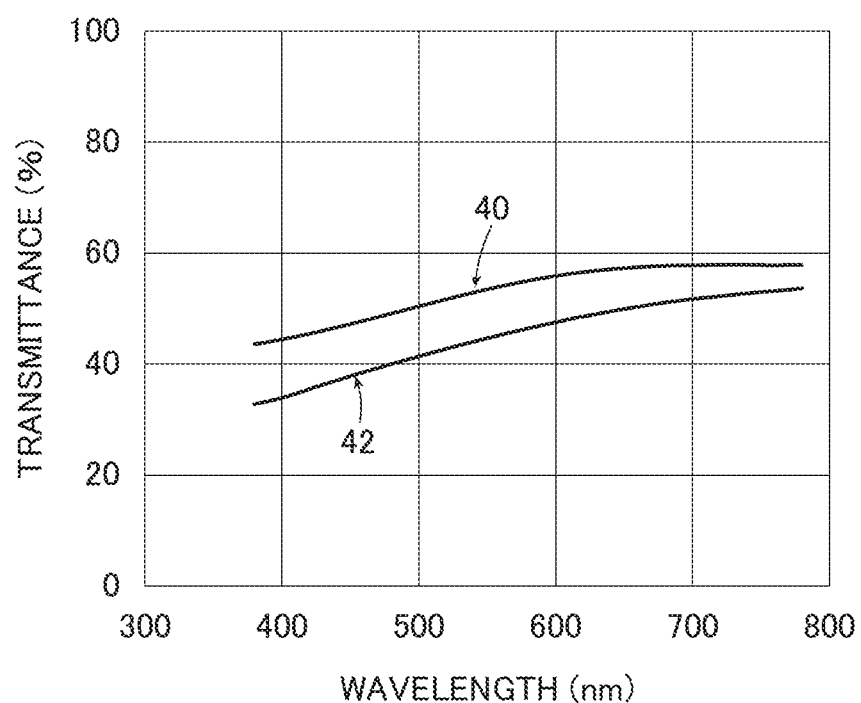
FIG. 4 is a graph showing the transmittance of the composite particles of titanium carbide and silicon and that of the titanium carbide particles.

Furthermore, the transmittance of the composite particles of titanium carbide and silicon was measured. FIG. 4 is a graph showing the transmittance of the composite particles of titanium carbide and silicon and that of the titanium carbide particles. Numeral 40 in FIG. 4 represents the titanium carbide, and numeral 42 represents the composite particles of titanium carbide and silicon.

As shown in FIG. 4, the composite particles of titanium carbide and silicon (represented by numeral 42) have the same degree of transmittance as the titanium carbide (represented by numeral 40) in a wavelength range for which the measurement was carried out.

Thus, the composite particles of titanium carbide and silicon have excellent oxidation resistance and also have the same degree of transmittance as the titanium carbide.

The transmittance is a value determined as follows: The composite particles of titanium carbide and silicon are dispersed in water with ultrasonic waves, and the transmittance is measured with an ultraviolet-visible spectrophotometer.

The composite particles are usable for, for example, a black matrix of a liquid crystal display device, an organic EL display device, or the like. The composite particles are usable as a light blocking material. In this case, the composite particles are usable as a light blocking material for a color filter and a light blocking material provided on the side of a thin film transistor which receives outside light.

The composite particles are usable also for printing ink, inkjet ink, a material for producing a photomask, a material for producing a proof for printing, etching resist, and solder resist.

Besides, the composite particles can be used for a catalyst support for example, and in this case, the performance of the catalyst can be enhanced since the particle size can be decreased.

The composite particles can be mixed with metal, oxide, plastic or other materials for use as, for instance, a pigment for adjusting the color tone.

Aside from that, the composite particles can be utilized in production of sintered bodies for use as electrical insulation materials for semiconductor substrates, printed circuit boards and various electrical insulation parts, materials for high-hardness and high-precision machining tools such as cutting tools, dies and bearings, functional materials for grain boundary capacitors and humidity sensors, and precision sinter molding materials, production of thermal sprayed parts such as engine valves made of materials that are required to be wear-resistant at a high temperature, and production of electrode or electrolyte materials and various catalysts for fuel cells.

In this embodiment, carbide fine particles can be formed to be nanosize particles, and therefore, use of those particles for, for example, a sintered body makes it possible to enhance the sintering properties, so that a sintered body with high strength can be obtained. As a result, for instance, a tool having excellent cutting properties can be obtained.

The present invention is basically configured as above. While the composite particles and the method of producing the composite particles according to the invention have been described above in detail, the invention is by no means limited to the foregoing embodiment and it should be understood that various improvements and modifications are possible without departing from the scope and spirit of the invention.

REFERENCE SIGNS LIST 10 fine particle production apparatus
12 plasma torch
14 material supply device
15 primary fine particle
16 chamber
18 fine particle (secondary fine particle)
19 cyclone
20 collecting section
22 plasma gas supply source
24 thermal plasma flame
28 gas supply device
30 vacuum pump

The invention claimed is:

1. Composite particles in which TiC is combined with Zr and Si, wherein a content of the Zr and a content of the Si are each 0.1 to 10 mass %.

* * * * *